Aug. 7, 1945.   A. C. DURDIN, 3D   2,381,579
SEWAGE TREATING APPARATUS
Filed Jan. 12, 1942   4 Sheets-Sheet 1
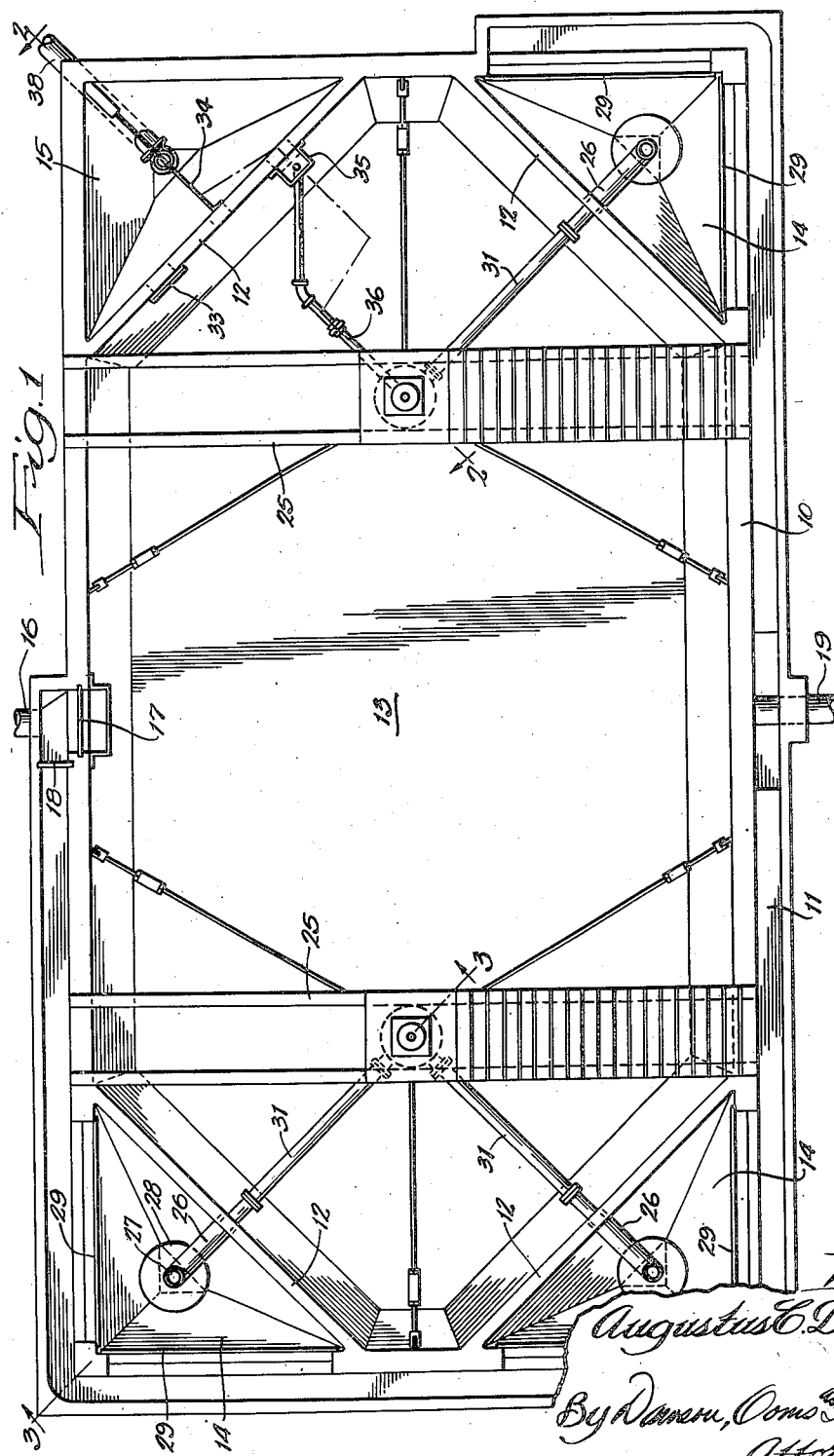

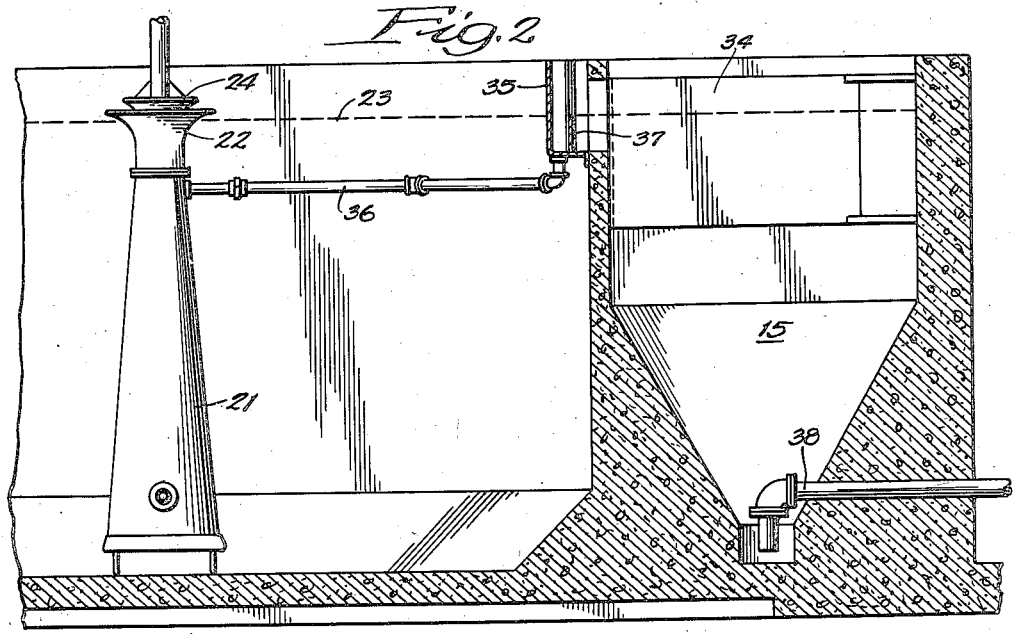
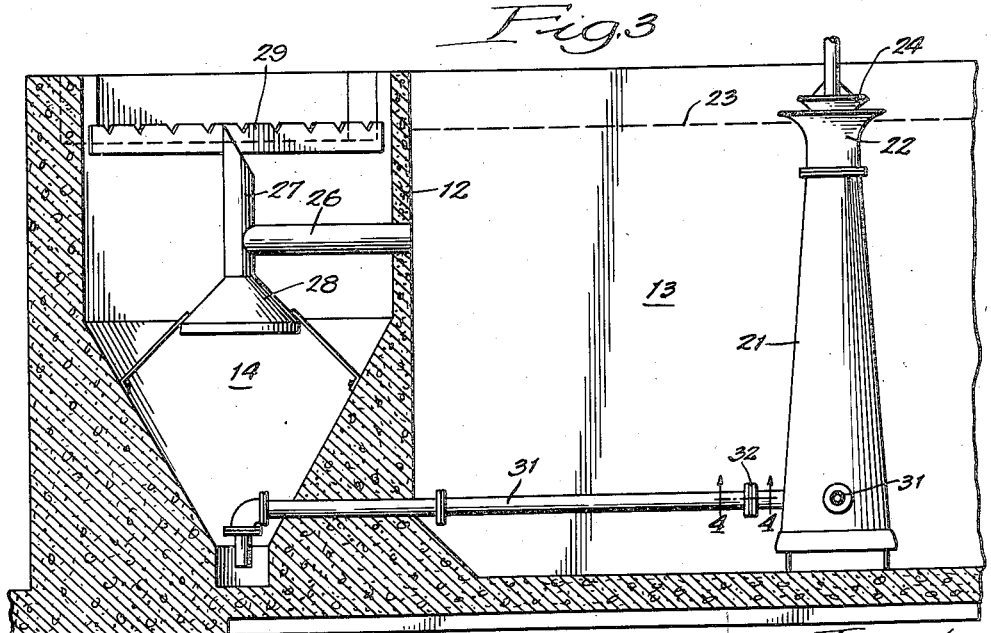
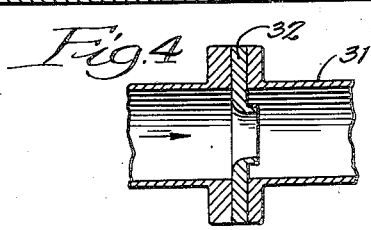

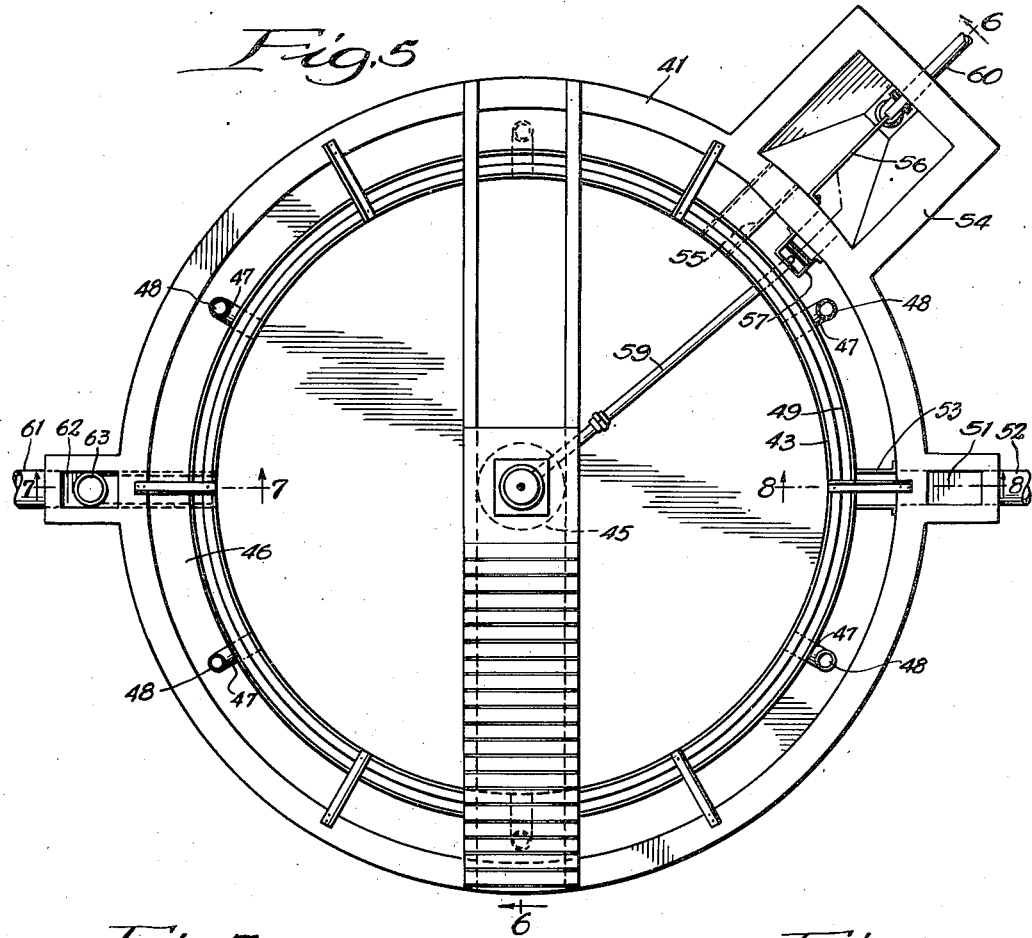
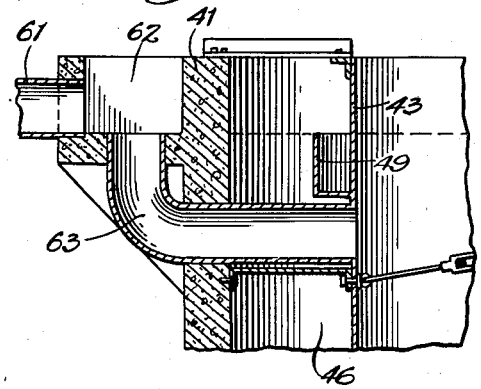
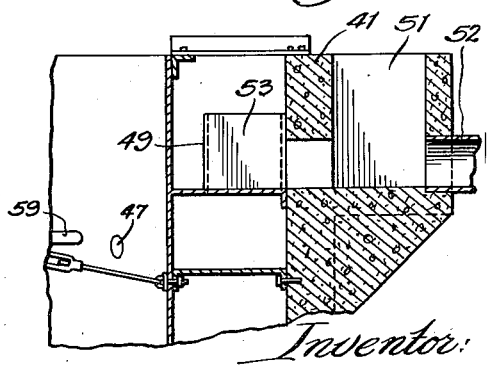

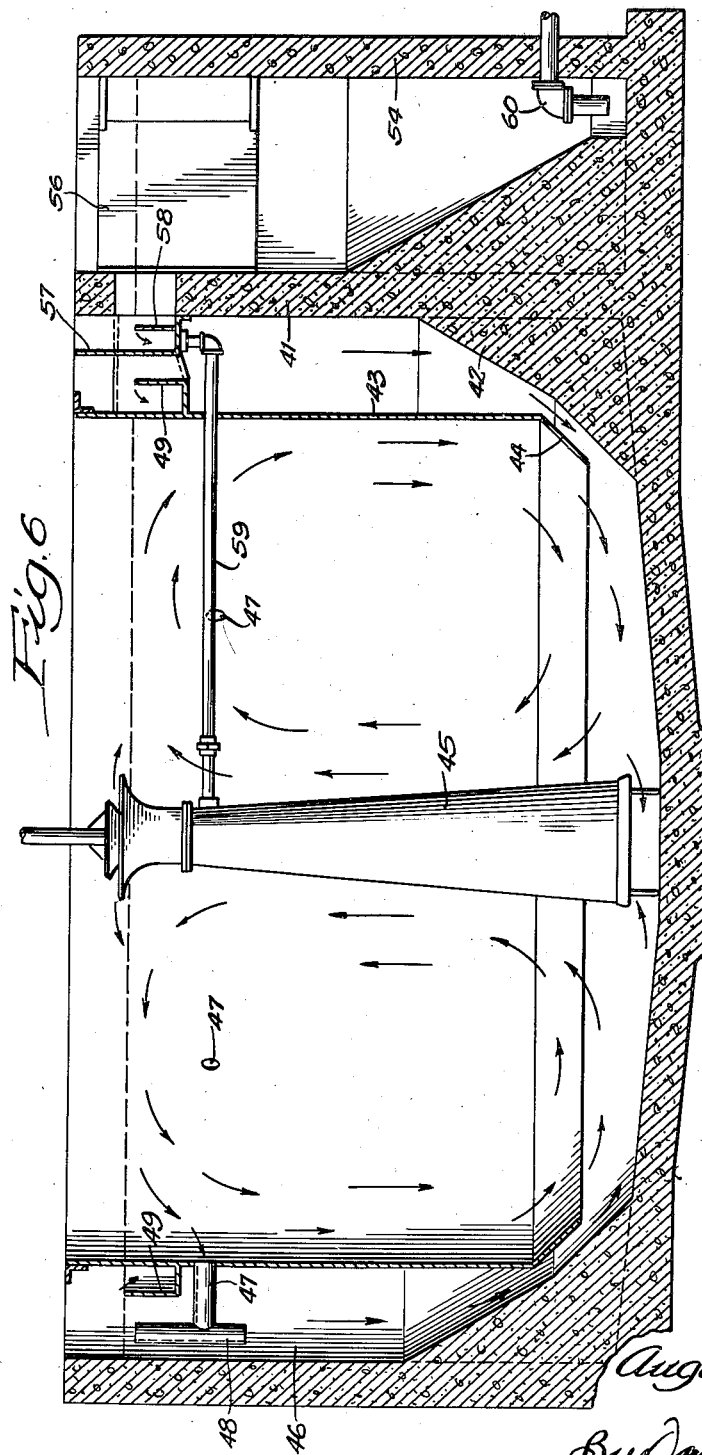

Patented Aug. 7, 1945

2,381,579

UNITED STATES PATENT OFFICE 2,381,579

SEWAGE TREATING APPARATUS

Augustus C. Durdin, III, Skokie, Ill.

Application January 12, 1942, Serial No. 426,426

9 Claims. (Cl. 210—8)

This invention relates to sewage treating apparatus and more particularly to apparatus for treating sewage according to the activated sludge method.

One of the objects of the invention is to provide sewage treating apparatus in which aeration and clarification of the sewage are accomplished in a single tank.

Another object of the invention is to provide sewage treating apparatus in which sludge is settled and continuously returned to the aeration chamber. According to one important feature the sludge is returned at a uniform rate without requiring a separate sludge pump.

Another object of the invention is to provide a sewage treating apparatus in which treated sludge is proportionately wasted as it accumulates in the apparatus.

Another object of the invention is to provide sewage treating apparatus for treating sludge according to the activated sludge method in a single tank. The tank is preferably divided into an aeration chamber and clarifier and waste sludge chambers, so connected that the complete activated sludge process can be carried out therein.

Still another object of the invention is to provide a sewage treating apparatus in which a plurality of aeration units, such for example as draft tubes, may be operated simultaneously in a single aeration chamber.

Other objects and advantages of the invention, including desirable sub-combinations and structural features, will be apparent from the following description when read in connection with the accompanying drawings, in which:

Figure 1 is a plan view of one type of apparatus embodying the invention;

Figure 2 is an enlarged section on the line 2—2 of Figure 1;

Figure 3 is an enlarged section on the line 3—3 of Figure 1;

Figure 4 is an enlarged section on the line 4—4 of Figure 3;

Figure 5 is a plan view of another type of apparatus embodying the invention;

Figure 6 is an enlarged section on the line 6—6 of Figure 5; and

Figures 7 and 8 are partial sections on the lines 7—7 and 8—8 of Figure 5.

The apparatus of Figures 1 to 4 includes a rectangular tank 10 having formed around the upper part thereof a trough or channel 11 which extends continuously around at least three of the four corners of the tank. The corners of the tank are separated from the main body thereof by diagonal partitions 12 dividing the tank into a central relatively large aeration chamber 13, three clarifier chambers 14, and a waste sludge chamber 15.

The sewage to be treated is supplied to the tank through an influent pipe 16 discharging into the tank over a weir 17. A weir 18 connects the inlet conduit 16 to the channel 11 so that in the event of unusually high sewage flow, a certain amount of the sewage may be by-passed directly into the channel. Sewage by-passed into the channel 11, as well as clear liquor from the clarifier chambers which also flows into the channel 11, as will be explained hereinafter, is removed through an effluent pipe 19 communicating with the channel 11 opposite the influent pipe 16.

As shown, the aeration chamber 13 is arranged to contain two aeration units, illustrated as being of the mechanical type. These units include vertical draft tubes 21 spaced above the bottom of the tank and terminating at their upper ends in flared outlet portions 22 located slightly above the normal liquid level in the tank, as indicated by the dotted line 23. A discharge cone 24 is supported in the upper end of each draft tube from a cross bridge construction 25 and each of the tubes is adapted to contain a pump or the like, not shown in detail, for causing a vertical upward circulation of sewage from the aeration chamber therethrough. The pump construction may be of the type more particularly described and claimed in my co-pending application, Serial No. 424,707, filed December 29, 1941, or any other desired structure for causing an upflow of sewage. With this construction, as is well understood in the art, the sewage is caused to circulate through the aeration chamber vertically through the draft tubes across the top of the liquid body, and down around the sides of the tank, the sewage being aerated in its passage over the top of the liquid body.

Each of the clarifier chambers 14, as best seen in Figure 3, communicates through a horizontal pipe 26 with the upper part of the aeration chamber 13. The pipe 26 connects to the mid portion of a vertical pipe 27 having a flared portion 28 at its lower end and terminating at its upper end in a slanting opening below the liquid level in the tank. A weir 29 is provided in the upper part of each clarifier chamber, controlling communication thereof with the effluent channel 11.

In operation of this construction, treated sewage from the aeration chamber flows through the horizontal pipe 26 into the vertical pipe 27. At this point, the velocity of the flowing stream is reduced so that clear liquor rises through the upper end of the pipe 27 while the heavier treated sludge drops through the funnel portion 28 to collect in the lower hopper-shaped portion of the clarifier chamber. The clear liquor flows over the weir 29 into the effluent channel 11 and out the effluent pipe 19, the liquid level in the tank and in the several chambers being controlled by the setting of the weirs 29.

Sludge collected in the lower part of the clarifier chambers is adapted to be returned to the aeration chamber in order that the process may be carried on properly, and for this purpose a pipe 31 is provided, terminating in an open end in the lower part of the clarifier chamber and connected to the lower portion of one of the draft tubes 21. As shown in Figure 1, in which three clarifier chambers are provided, two of the pipes 31 are connected with one of the draft tubes, while the other pipe is connected to the other draft tube. In order that the flow through the several pipes 31 may be maintained in the desired proportion, orifice plates 32, as shown in Figure 4, may be provided, in each of the pipes. These orifice plates may be made the same size in each pipe to maintain the several flows substantially the same, or may be varied as desired to proportion the flows in any desired manner.

The waste sludge chamber 15 communicates with the aeration chamber through a gate opening 33 arranged adjacent one side of the waste sludge chamber at the upper part thereof. A vertical partition 34 is arranged substantially centrally of the waste sludge chamber extending slightly above the liquid level and terminating in the waste sludge chamber above the bottom thereof. As shown, the rear edge of the partition is spaced from the wall of the waste sludge chamber to provide a passage around the partition at the surface of the liquid. On the side of the partition opposite the inlet opening 33, a waste sludge control box 35 is provided, connected to the adjacent draft tube by means of a pipe 36. As shown in Figure 2, the waste sludge control box 35 communicates with the waste sludge chamber over a weir 37, so that clear liquor from the top of the waste sludge chamber may be returned to the draft tube 21. It will be noted that the tube 36 communicates with the draft tube, to which only one of the sludge return pipes 31 is connected.

In operation of this construction, sewage entering the aeration chamber 13 through the influent pipe 16 is aerated in the presence of return sludge by means of the draft tubes 21. It will be appreciated that due to the construction of the tank unit, any desired number of draft tubes or similar aerating means can be provided, either more or less than the two illustrated in the drawings. As the sewage is treated, a portion thereof is continuously withdrawn through the pipes 26 into the several clarifier chambers, where the clear liquor is separated from the sludge and flows from the apparatus over the outlet weirs 29. At the same time, the sludge separated from this clear liquor is returned to the aeration tank to assist in the treatment of the fresh sewage, so that the process may be operated continuously.

Treated sewage flowing through the opening 33 into the waste sludge chamber 15 is separated into clear liquor which flows around the partition 34 and into sludge which settles into the bottom of the chamber. The clear liquor is returned to the aeration chamber through the waste sludge control box 35 and the conduit 36, while the sludge settling to the bottom of the chamber may be withdrawn through a conduit 38 to be disposed of in any desired manner. It will be noted that flow through the draft tubes created by the pumping means therein induces a flow of return sludge from the clarifier chambers through the conduits 31 and at the same time withdraws clear liquor from the waste sludge chamber through the control box 35 into the aeration chamber. Thus, both the sludge from the clarifier chambers and the clear liquor from the waste sludge chamber are returned to the system in amounts proportionate to the amount of sewage being treated without requiring any separate or additional pumping means. At the same time, a proportionate amount of sludge is wasted through the waste sludge chamber and clear liquor is wasted through the clarifier chambers so that the process is maintained in continuous operation.

Figures 5 to 8 illustrate an alternative construction, more particularly adapted for smaller installations utilizing only a single draft tube. As shown in these figures, the apparatus comprises a circular tank 41 formed adjacent its bottom with a filleted portion 42 providing an inwardly and downwardly sloping wall. Within the tank and spaced from the walls thereof an annular partition 43 is supported, terminating in a lower edge portion 44 lying spaced from and substantially parallel to the filleted portion 42. A draft tube 45 is mounted centrally of the tank to create an upward circulation adjacent the center and a downward circulation around the inner wall of the partition 43.

The annular space around the partition 43 forms a clarifier chamber 46, which communicates with the inner aeration chamber inside the partition through a series of horizontal pipes 47 connected to vertical pipes 48. Treated sewage flowing into the clarifier chamber through the pipes 47 separates in the pipes 48, the clear liquor rising and the sludge dropping to the bottom of the chamber. The clear liquor flows into an annular effluent channel 49 carried by the partition and is withdrawn therefrom into an effluent box 51 (Figure 8) and effluent pipe 52. As best seen in Figure 8, the channel 49 communicates with the effluent box 51 through an open channel formed by spaced vertical walls 53 spanning the spaces between the annular channel 49 and the exterior of the tank 41.

A waste sludge chamber is provided formed by vertical walls 54 on the exterior of the tank 41 and communicating with the upper portion of the aeration chamber through a conduit 55. The conduit 55 connects to one side of the waste sludge chamber which is divided by a vertical partition 56 extending above the normal liquid level and terminating above the bottom of the chamber, and having its rear vertical edge spaced from the waste sludge chamber. Clear liquor is withdrawn from the waste sludge chamber on the opposite side of the partition through a waste sludge control box 57, over a weir 58. Clear liquor from the waste sludge control box 57 is returned to the draft tube 45 through a pipe 59. Waste sludge collecting in the lower portion of the waste sludge chamber may be withdrawn through a sludge pipe 60, opening into the lower portion of the chamber.

Sewage to be treated is supplied to the tank, as best seen in Figure 7, through an influent pipe

61 opening into an influent box 62. A pipe 63 connected to the lower part of the box 62 spans the annular clarifier chamber 46 and connects with the partition 43 to provide communication from the box 62 to the inner aeration chamber of the apparatus.

In operation of this construction, sewage is rotated in the inner aeration chamber provided by the annular partition 43 and circulates upwardly in the center of the chamber and downwardly along the inner walls of the partition, as shown by the arrows in Figure 6. Treated sewage flows from the aeration chamber into the clarifier chamber through the pipes 47 and is separated, the clear liquor flowing into the annular channel 49 and out through the effluent conduit, while the heavier sludge settles in the lower portion of the annular clarifier chamber. It will be noted that due to the construction of the edge portion 44, the flow of sewage in the aeration chamber across the edge portion 44 induces a flow from the clarifier chamber into the lower portion of the aeration chamber. This sludge settling in the clarifier chamber will be returned to the aeration chamber to activate fresh sewage supplied thereto through the influent pipe.

At the same time, treated sewage from the aeration chamber flows through the conduit 55 into the waste sludge chamber, where it must pass around the baffle or partition 56. Clear liquor will rise on the opposite side of the baffle 56, to be returned to the draft tube through the control box 57 and the pipe 59. Sludge settling in the waste sludge chamber may be withdrawn through the pipe 60.

While two embodiments of the invention have been shown and described in detail, it will be understood that these are illustrative only, and are not to be taken as a definition of the scope of the invention, reference being had for this purpose to the appended claims.

What is claimed is:

1. Sewage treating apparatus comprising a tank separated into an aeration chamber and a clarifier chamber, means to supply sewage to the aeration chamber, means in the aeration chamber for aerating the sewage therein and for causing a circulation of sewage in the chamber, a pipe extending horizontally from the upper part of the aeration chamber into the upper part of the clarifier chamber, a vertical pipe in the clarifier chamber open at its top and bottom ends and communicating in its center part with the first named pipe, means at a higher level than the top open end of the vertical pipe to withdraw clear liquor from the upper part of the clarifier chamber, and means providing communication between the lower part of the clarifier chamber and the aeration chamber to return collected sludge from the clarifier chamber to the aeration chamber.

2. Sewage treating apparatus comprising a tank separated into an aeration chamber and a plurality of clarifier chambers, a vertical draft tube in the aeration chamber, pump means in the tube to create an upward flow therethrough, means connecting the upper part of the aeration chamber to the upper parts of the clarifier chambers, means to withdraw clear liquor from the upper parts of the clarifier chambers, conduits connecting the lower parts of the clarifier chambers respectively to the draft tube, and means in each of the conduits forming flow restrictions therein to proportion the flows from the clarifiers to the draft tube.

3. Sewage treating apparatus comprising a tank divided into an aeration chamber, a clarifier chamber and a waste sludge chamber, a vertical draft tube in the aeration chamber, means in the draft tube to cause a vertical circulation of sewage from the aeration chamber therethrough, a connection from the upper part of the aeration chamber to the clarifier chamber, means to withdraw clear liquor from the upper part of the clarifier chamber, a conduit from the lower part of the clarifier chamber to the draft tube to conduct collected sludge thereto, a connection from the upper part of the aeration chamber to the waste sludge chamber, a return connection from the upper part of the waste sludge chamber to the draft tube to return clear liquor to the draft tube, and means to withdraw waste sludge from the lower part of the waste sludge chamber.

4. Sewage treating apparatus comprising a tank divided into an aeration chamber, a clarifier chamber and a waste sludge chamber, means to supply sewage to the aeration chamber, a plurality of vertical draft tubes in the aeration chamber, means in each of the draft tubes to cause a vertical circulation of sewage from the aeration chamber therethrough, a connection from the upper part of the aeration chamber to the clarifier chamber, means to withdraw clear liquor from the upper part of the clarifier chamber, a conduit from the lower part of the clarifier chamber to one of the draft tubes to conduct collected sludge thereto, a connection from the upper part of the aeration chamber to the waste sludge chamber, a return connection from the upper part of the waste sludge chamber to the other of the draft tubes to return clear liquor to the draft tube, and means to withdraw waste sludge from the lower part of the waste sludge chamber.

5. Sewage treating apparatus comprising a tank divided into a relatively large aeration chamber, a plurality of clarifier chambers, and a waste sludge chamber, means to supply sewage to the aeration chamber, a plurality of vertical draft tubes in the aeration chamber, means in each of the draft tubes to cause a vertical circulation of sewage from the aeration chamber therethrough, connections from the upper part of the aeration chamber to each of the clarifier chambers, means for withdrawing clear liquor from the upper part of each of the clarifier chambers, a conduit leading from the lower part of each of the clarifier chambers, at least one of the conduits being connected to each of the draft tubes to return collected sludge thereto, a connection from the upper part of the aeration chamber to the waste sludge chamber, a return connection for clear liquor from the upper portion of the waste sludge chamber to one of the draft tubes, and means to withdraw waste sludge from the lower portion of the waste sludge tank.

6. Sewage treating apparatus comprising a tank divided into a relatively large aeration chamber, a plurality of clarifier chambers, and a waste sludge chamber, means to supply sewage to the aeration chamber, a plurality of vertical draft tubes in the aeration chamber, means in each of the draft tubes to cause a vertical circulation of sewage from the aeration chamber therethrough, connections from the upper part of the aeration chamber to each of the clarifier chambers, means for withdrawing clear liquor from the upper part of each of the clarifier chambers, a conduit leading from the lower part of each of the clarifier chambers, at least one of the conduits being connected to each of the draft tubes to return collected sludge thereto, a connection from the upper part of the aeration chamber to the waste sludge chamber, a return connection for clear liquor from the upper portion of the waste sludge chamber to one of the draft tubes, a partition in the upper part of the waste sludge tank between the connections thereto and terminating above the bottom of the waste sludge tank and around which liquid must flow from one connection to the other, and means to withdraw waste sludge from the lower part of the waste sludge tank.

7. Aeration apparatus comprising a substantially circular tank having a filleted portion sloping inwardly and downwardly adjacent its bottom, an annular partition in the tank terminating in a bottom edge spaced from and substantially parallel to the filleted portion, a vertical draft tube arranged substantially at the center of the tank, means in the tube to create an upward circulation of sewage from the tank therethrough so that the sewage will flow downwardly adjacent the inner surface of the partition and across the lower edge thereof, means to conduct sewage through the partition from the inner to the outer side thereof at its upper part, and means to withdraw clear liquor from the upper part of the space around the partition, sludge settling in said space being returned to the center part of the tank by gravity and by the action of the flow inside of the partition across the lower edge of the partition.

8. Sewage treating apparatus comprising a tank separated into an aeration chamber and a clarifier chamber, means to supply sewage to the aeration chamber, means in the aeration chamber for aerating the sewage therein and for causing a circulation of sewage in the chamber, a pipe extending horizontally from the upper part of the aeration chamber into the upper part of the clarifier chamber, a vertical pipe in the clarifier chamber open at its top and bottom ends and communicating in its center part with the first named pipe, an effluent weir communicating with the clarifier chamber at a higher level than the top open end of the vertical pipe over which clear liquor from the upper part of the clarifier chamber is discharged, and means providing communication between the lower part of the clarifier chamber and the aeration chamber to return collected sludge from the clarifier chamber to the aeration chamber.

9. Sewage treating apparatus comprising a tank separated into an aeration chamber and a clarifier chamber, means to supply sewage to the aeration chamber, means in the aeration chamber for aerating the sewage therein and for causing a circulation of sewage in the chamber, a pipe extending horizontally from the upper part of the aeration chamber into the upper part of the clarifier chamber, a vertical pipe in the clarifier chamber open at its top and bottom ends and communicating in its center part with the first named pipe, an effluent weir communicating with the clarifier chamber at a higher level than the top open end of the vertical pipe over which clear liquor from the upper part of the clarifier chamber is discharged, and means forming a connecting passage between the lower part of the clarifier chamber and the aeration chamber and so constructed and arranged that circulation of sewage in the aeration chamber induces a flow of sludge from the clarifier chamber to the aeration chamber.

AUGUSTUS C. DURDIN, III.